United States Patent [19]

Kitamura

[11] Patent Number: 5,009,555
[45] Date of Patent: Apr. 23, 1991

[54] TOOL HOLDER FOR MACHINE TOOL
[75] Inventor: Koichiro Kitamura, Toyama, Japan
[73] Assignee: Kitamura Machinery Co., Ltd., Toyama, Japan
[21] Appl. No.: 322,125
[22] Filed: Mar. 13, 1989
[30] Foreign Application Priority Data Mar. 25, 1988 [JP] Japan ................... 63-69256

[51] Int. Cl.⁵ ............................ B23B 31/04
[52] U.S. Cl. .................. 409/232; 409/234; 408/239 R; 279/1 TS
[58] Field of Search ............ 409/232–234; 29/DIG. 45; 427/255.2, 249, 248.1, 295; 279/1 TS; 408/239 A, 239 R, 226

[56] References Cited
U.S. PATENT DOCUMENTS 4,463,033 7/1984 Kikuchi et al. .......... 427/255.2 X
4,607,989 8/1986 Kitamura ............... 409/234 X
4,619,866 10/1986 Smith et al. ............ 427/255.2 X

FOREIGN PATENT DOCUMENTS 175064 3/1986 European Pat. Off. ........ 409/231
21706 2/1981 Japan ..................... 409/232
79932 4/1987 Japan ..................... 409/232

Primary Examiner—Larry I. Schwartz
Assistant Examiner—Robert Schultz
Attorney, Agent, or Firm—Wegner, Cantor, Mueller & Player

[57] ABSTRACT

A machine tool has a machine tool body (3), a spindle (1) having a supporting portion (2) and being rotatably supported by the machine tool body (3), and a tool holder (5) having an inserting portion (6) attached to the supporting portion (2). A coating layer (10) made of a hard material including titanium is provided on the supporting portion (2) of the spindle (1) and/or the inserting portion (6) of the tool holder (5).

10 Claims, 5 Drawing Sheets

TOOL HOLDER FOR MACHINE TOOL

BACKGROUND OF THE INVENTION

This invention relates to a machine tool and in particular relates to an improved tool holder and/or spindle in a machine tool.

In general, a spindle of a machine tool has a supporting portion for a tool holder. An inserting portion of the tool holder is inserted into the supporting portion so that the tool holder is attached to the spindle. An outer surface of the inserting portion is covered by a layer made of a cemented and hardened steel, hard chrome-plating, or other cemented metals.

Many tool holders are often exchanged between the spindle and a tool magazine by means of a tool changer. When the inserting portion of the tool holder engages the supporting portion of the spindle and a supporting portion of the tool magazine, some friction is produced between them so that the inserting portion of the tool holder is apt to be easily worn. For such a reason, it becomes incomplete to attach the tool holder to the spindle and/or the tool magazine. In other words, the life time of the tool holder is short.

SUMMARY OF THE INVENTION

The object of the invention is to provide a machine tool in which a tool holder can have a long life time.

According to the invention, a machine tool comprises a machine tool body, a spindle rotatably supported by the machine tool body, the spindle having a supporting portion, a tool holder having an inserting portion to be attached to the supporting portion, and a coating layer formed on the inserting portion of the tool holder and-/or the supporting portion of the spindle. The coating layer is made of a hard material including titanium such as a titanium alloy, a titanium compound or the like.

DETAILED DESCRIPTION OF THE PREFERRED EMBODIMENTS

Figure 1:
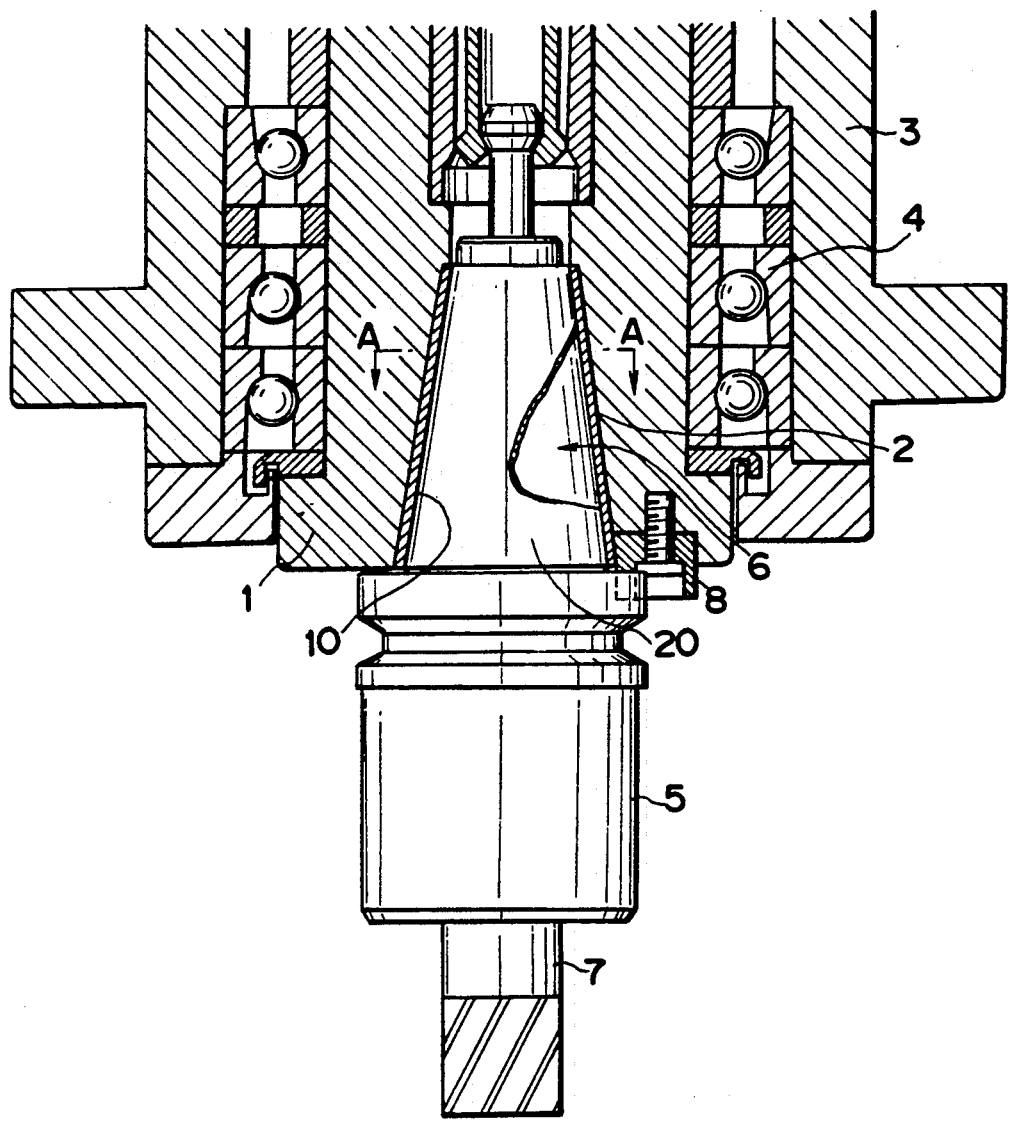
FIG. 1 shows a vertical section showing an essential portion of a machine tool according to an embodiment of the invention.
Figure 2:
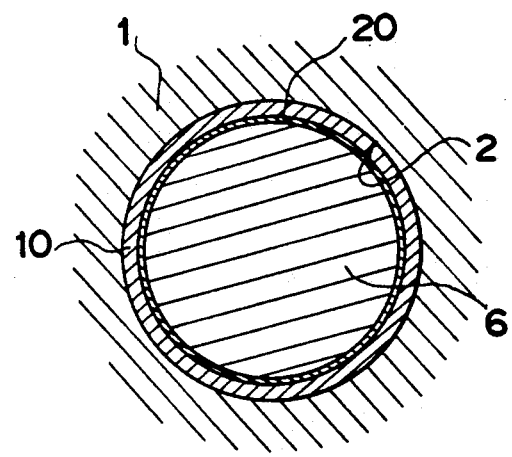
FIG. 2 is a sectional view taken along the line A—A of FIG. 1.

Referring now to FIGS. 1 and 2, a machine tool includes a spindle 1 having a supporting portion 2. A tapered inserting portion 6 of a tool holder 5 is inserted into the supporting portion 2 in a conventional manner and attached thereto by a collet chuck (not shown). A machine tool body 3 supports the spindle 1 rotatably by way of plural ball bearings 4. A tool 7 is held by the tool holder 5. A stopper 8 is secured to a lower end portion of the spindle 1 so as to prevent the tool holder 5 from rotating relative to the spindle 1.

A ceramic layer 10 is provided on an inner surface of the supporting portion 2 of the spindle 1. The ceramic layer 10 can be formed on the supporting portion 2 in such a way as disclosed in U.S. Pat. No. 4,607,989. For example, a ceramic material is coated on the supporting portion 2 of the spindle 1 to thereby form the ceramic layer 10. The ceramic layer 10 can be formed in any other manner.

Figure 5:
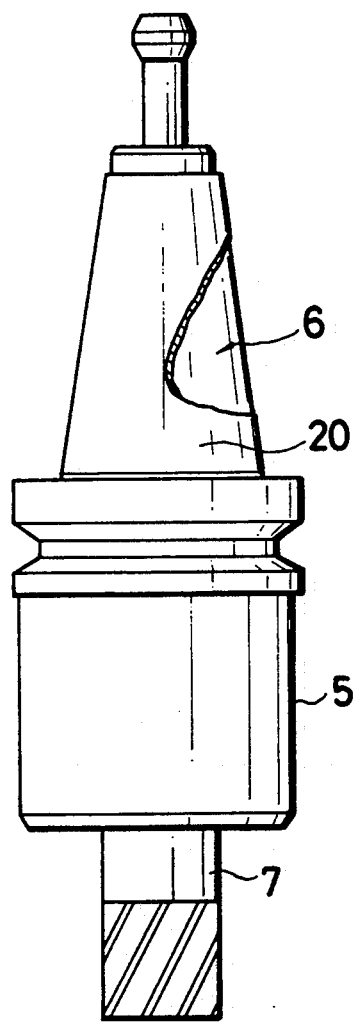
FIG. 5 is a side view, partly broken, showing only the tool holder shown in FIG. 1.

Referring to FIGS. 1, 2 and 5, a coating layer 20 made of a titanium compound such as TiN, TiC or TiCN is formed on the inserting portion 6 of the tool holder 5. Preferably, the basic structure of the tool holder is made of a steel, and the coating layer 20 is formed thereon by a CVD method, such as a vacuum chemical vapor deposition at a high temperature ranging between 900° C. and 1100° C. The CVD coating can have a high purity, an excellent hardness and a thin thickness. Also, the CVD coating can be composed of plural layers.

If the coating layer 20 is made of such a hard material, the inserting portion 6 of the tool holder 5 can have an excellent wear resistance so as to ensure a long life time. In addition, the coating layer 20 can be fitted and strongly joined to the basic structure of the tool holder 5.

Figure 3:
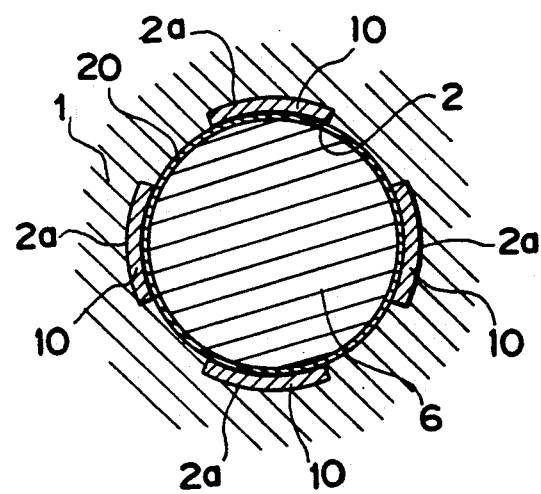
FIG. 3 shows a horizontal section showing an essential portion of a machine tool according to a further embodiment of the invention.

FIG. 3 shows another embodiment of the invention. A plurality of plate-like ceramic layers 10 are separately placed in a plurality of arc-shaped recesses 2a formed on the supporting portion 2 of the spindle 1. Except the ceramic layer 10, the embodiment of FIG. 3 is substantially the same as the embodiment of FIGS. 1 and 2.

Figure 4:
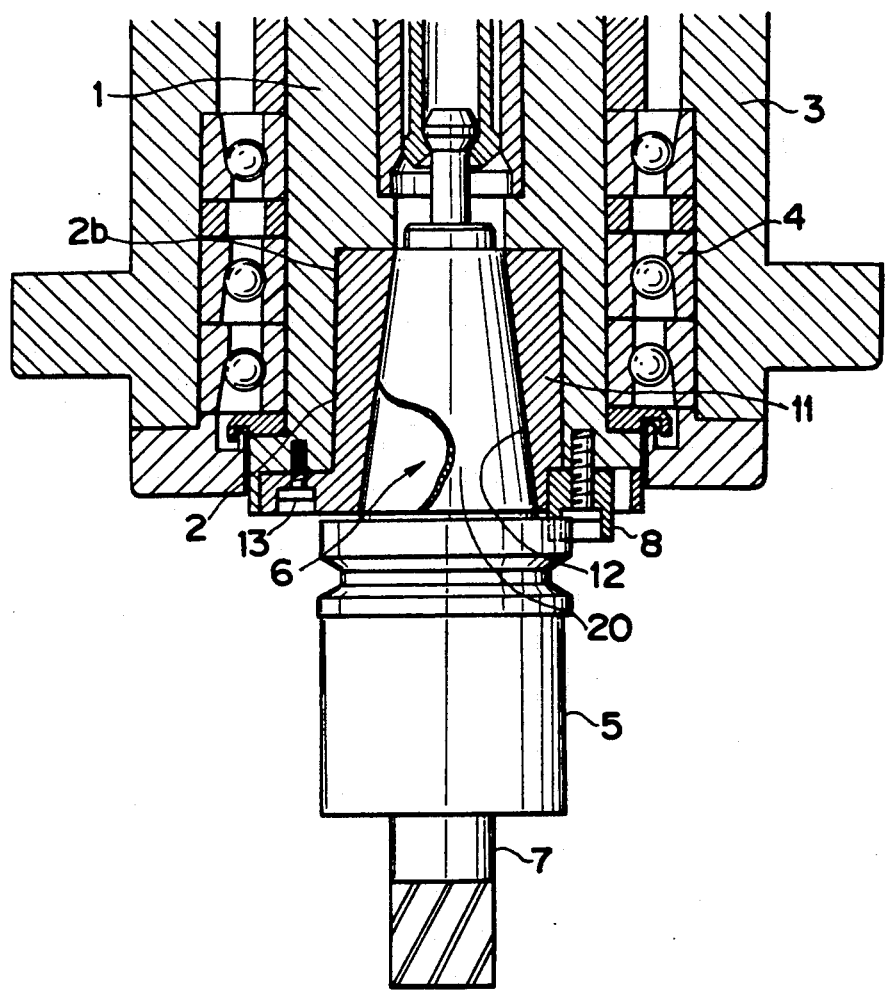
FIG. 4 shows a vertical section showing an essential portion of a machine tool according to another embodiment of the invention.

FIG. 4 shows a further embodiment of the invention. A cylindrical opening 2b is formed in a supporting portion of the spindle 1. A ceramic sleeve 11 has an outer configuration corresponding to the cylindrical opening 2b of the spindle 1. The ceramic sleeve 11 is fitted into the opening 2b of the spindle 1 and fixed to the spindle 1 by means of a screw 13. The ceramic sleeve 11 has a tapered supporting portion 12 onto which the inserting portion 6 of the tool holder 5 is attached. The stopper 8 is provided in the shown embodiment although it can be omitted.

Figure 6:
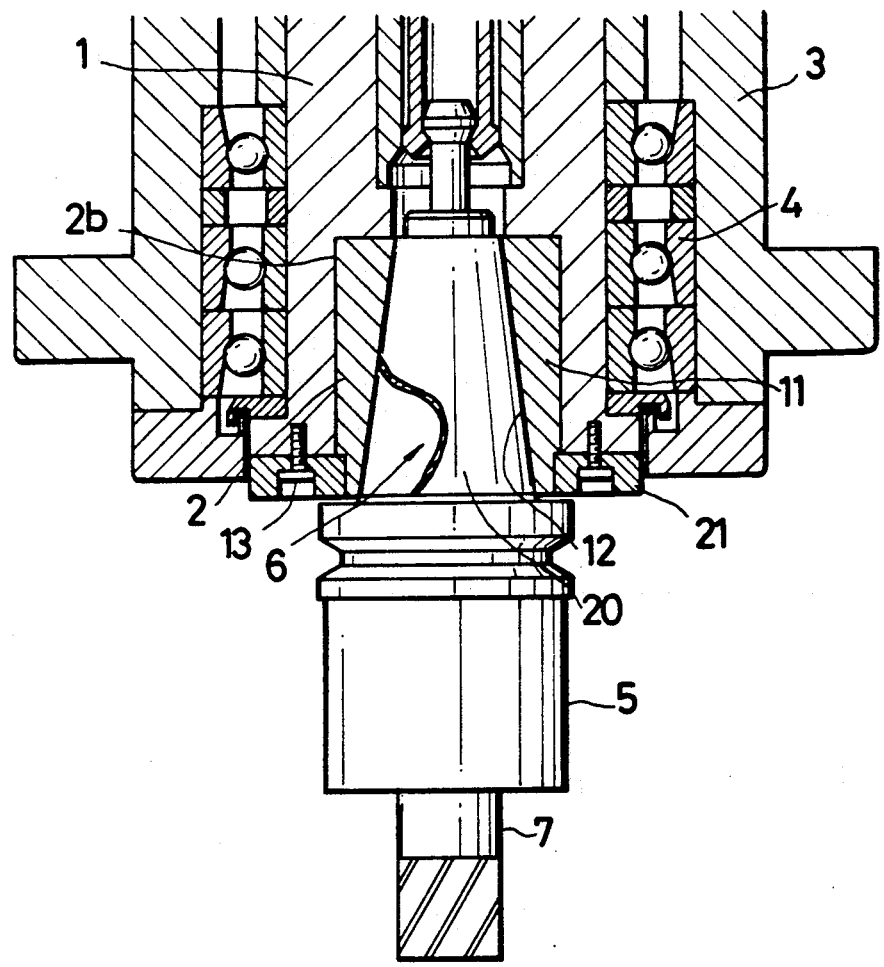
FIG. 6 shows a vertical section showing an essential portion of a machine tool according to still another embodiment of the invention.

FIG. 6 shows a further embodiment similar to the embodiment of FIG. 4 except means for fixing the sleeve 11 to the supporting portion 2 of the spindle 1. A ring 21 is fixed to the lower end of the supporting portion 2 by means of plural screws 13 so as to press the sleeve 11 against the opening 2b of the spindle. If the screws 13 are released, then the ring 21 and the sleeve 11 can be easily removed from the spindle 1.

Although in the above-stated embodiments of the invention the inserting portion 6 of the tool holder 5 and the supporting portion 2 of the spindle 1 are tapered, the invention is not limitted thereto For instance, the inserting portion 6 of the tool holder 5 and the supporting portion 2 of the spindle 1 can be formed in any configuration. The ceramic layers can be omitted. Also, a hard layer made of the same material as the coating layer 20 can be formed in place of the ceramic layer 10, 11.

Any other embodiments and modifications of the invention are possible within the scope of the invention.

What is claimed is:

1. A machine tool comprising a machine tool body, a spindle rotatably supported by the machine tool body, the spindle having a supporting portion, a tool holder having an inserting portion to be attached to the supporting portion, a protecting layer fixed to the supporting portion for covering the supporting portion, said tool holder having a coating layer formed on the inserting portion thereof, the coating layer being made of a titanium compound selected from the group consisting of TiN, TiC and TiCN, the protecting layer being made of a ceramic material.

2. A machine tool as claimed in claim 1, wherein the coating layer is a CVD coating.

3. A machine tool as claimed in claim 1, wherein the supporting portion of the spindle has a tapered opening into which the inserting portion of the tool holder is fitted.

4. A machine tool as claimed in claim 1, wherein the supporting portion of the spindle is covered entirely by the protecting layer.

5. A machine tool as claimed in claim 1, wherein the supporting portion of the spindle is covered partly by the protecting layer.

6. A machine tool as claimed in claim 5, wherein a plurality of plate-like protecting layers are separately placed on the supporting portion of the spindle.

7. A machine tool as claimed in claim 5, wherein a plurality of arc-shaped recesses are formed in the supporting portion of the spindle, and each of the protecting layers is fixed in each of the recesses.

8. A machine tool comprising a machine tool body, a spindle rotatably supported by the machine tool body, the spindle having a supporting portion, a tool holder having an inserting portion to be attached to the supporting portion, a coating layer formed on the inserting portion of the tool holder, the coating layer being made of a titanium compound selected from the group consisting of TiN, TiC and TiCN, the supporting portion having an opening, a sleeve made of a ceramic material and fixed in the opening of the supporting portion of the spindle, the sleeve having a supporting portion to which the coating layer formed on the inserting portion of the tool holder is detachably attached.

9. A machine tool as claimed in claim 8, wherein the supporting portion of the sleeve is formed in a tapered hole.

10. A machine tool as claimed in claim 8, wherein a ring is fixed to the supporting portion of the spindle so as to fix the sleeve into the opening of the supporting portion.

* * * * *